United States Patent [19]

Harris et al.

[11] Patent Number: 5,276,607
[45] Date of Patent: Jan. 4, 1994

[54] METHOD FOR OPTIMAL RECALCULATION

[75] Inventors: Bret M. Harris, Midvale, Utah; A. Lewis Bastian, Tucson, Ariz.

[73] Assignee: WordPerfect Corporation, Orem, Utah

[21] Appl. No.: 502,162

[22] Filed: Mar. 28, 1990

[51] Int. Cl.$^5$ .............................................. G06F 15/22
[52] U.S. Cl. .................................... 364/401; 364/408
[58] Field of Search ............... 364/408, 401; 395/148, 395/161

[56] References Cited

U.S. PATENT DOCUMENTS 5,055,998  10/1991  Wright .................................. 395/800
5,095,429  3/1992  Harris ................................... 364/408

Primary Examiner—Emanuel S. Kemeny

[57] ABSTRACT

A process and apparatus for recalculating the contents of a spreadsheet's cells when they are affected by a modification of one or more cells in the spreadsheet is disclosed. After a spreadsheet has been modified, each cell in the spreadsheet is examined only once to determine the order of the cell recalculation and only the affected cells are recalculated. A list indicating which cells have been modified is maintained at all times in the computer prior to recalculation. When the computer is instructed to update the values in the spreadsheet cells, the recalculation method begins by placing an indication of cells affected by modification, one by one, on either of two lists independently maintained by the computer in storage: the final list (L LIST) if all cells in its Dependency Set (the set of cells affected by a modification to this cell) are already in the final list, or the intermediate list (R LIST) if it has a cell in its Dependency Set which is not already in the final list.

4 Claims, 3 Drawing Sheets

METHOD FOR OPTIMAL RECALCULATION

DEFINITIONS

The following definitions will assist in understanding the invention:

CELL:

The basic element of a two-dimensional array which defines a spreadsheet. Typical spreadsheet dimensions are 256 columns and 8192 rows. Rows are numbered sequentially beginning with 1. Columns are lettered sequentially beginning with A. Cells are referred to using the convention cell "CR," where "C" is the column and "R" is the row locating the cell in the spreadsheet. The first cell of the spreadsheet is thus referred to as cell "A1." Cells may be defined to contain any of a number of information types, including text strings, mathematical formulas, numbers, links, or cell references.

DEPENDENCY SET:

For a given cell, this set consists of the addresses of all cells which need to be recalculated when the cell is modified. For example, Cell B2 is in the Dependency Set of Cell A1 if Cell A1 is referenced in the formula contained in Cell B2 (e.g., B2=A1+C2).

LIFO LIST ("L LIST"):

A stack containing a list of optimally reordered cells. When the L LIST is complete, the cells in the list are then recalculated sequentially in the reverse order of which the list was built (i.e., last-in, first-out). The cell recalculation method described herein seeks to create an L LIST in the shortest amount of time possible.

RECURSION LIST ("R LIST"):

A last-in, first-out stack containing an intermediate list of modified cells before they are placed in the L LIST. A cell is placed in the R LIST when the cell needs to be recalculated and it has one or more cells in its Dependency Set; the cell is removed from the R LIST and placed on the L LIST when all cells in its Dependency Set have been added to the L LIST.

CELL INFORMATION LIST:

A list containing a block of information for each cell in the spreadsheet, including (1) whether the cell needs to be recalculated (the "Modified Bit"), (2) whether the cell contains a formula, and (3) whether the cell is in either the R LIST or the L LIST.

BACKGROUND OF THE INVENTION

This invention relates to computerized spreadsheet technology. A method of using a digital computer for the of recalculating the contents of spreadsheet's cells when they are affected by a modification of one or more cells in the spreadsheet is disclosed. The reader is directed to the DEFINITIONS section for the meaning of certain terms used herein.

A spreadsheet is an accounting tool which is typically used to model business, economic and other similar systems. A spreadsheet (also referred to generically as a "worksheet") is represented by a two-dimensional array with individual array elements, defined by row and column placement, referred to as "cells." Each cell in a spreadsheet can contain one of several information types, including text strings, mathematical formulas, numbers, and links or references to other cells. In a spreadsheet which models a small business, for example, a first cell might contain a number representing the business's revenue for a given year. A second cell might contain a formula for calculating the business's costs for the same year. A third cell in the spreadsheet might contain a formula which subtracts the value resulting from the formula in the second cell (costs) from the value of the first cell (revenue) with the result being the business's gross profit for the year. Additional cells containing data or formulas to calculate taxes and other business expenses may be added to expand the model. Together, the contents of the cells form a financial model of the business.

An important aspect of computerized spreadsheet technology is recalculation of the contents of the spreadsheet's cells after one or more cells have been modified. (As explained above, each cell in a spreadsheet is of a distinct information type, whether it be a number, formula, or otherwise. A cell which contains a formula or a number has a value associated with it which is simply the value of the number or the mathematical result of the formula. The term "recalculation" refers to the determination of a cell's new value after it or a cell upon which it depends for its value has been modified.)

Initially, the spreadsheet user enters various formulas and data in the spreadsheet cells to create a model. Thereafter, a spreadsheet user will often want to test several possible outcomes of a particular problem by modifying the parameters of his model, i.e., by modifying formulas or data in the spreadsheet cells. Modifications are also often made to correct errors in the model. Each cell modification potentially affects the value of several other cells in the spreadsheet. For example, a cell may contain a number representing a business's net profit. That cell may be referenced by many other cells in the spreadsheet which use it to calculate, for instance, taxes or dividends. Each of those cells may, in turn, be referenced by multiple other cells. Thus, a change in the contents of even a single spreadsheet cell can have wide-ranging effects on cells throughout the entire spreadsheet. Multiple cell modifications can, therefore, make recalculation of a sophisticated spreadsheet model a complex and time consuming process. Recalculation of a complete spreadsheet can involve not only moving data between numerous memory locations in the microprocessor, but also the performance of mathematical operations by the microprocessor on large quantities of data. These operations require large numbers of clock cycles and intensive use of the microprocessor, thereby slowing down other computer activities. Thus, a quick and efficient recalculation method presents a distinct advantage to the spreadsheet user.

The recalculation invention described herein performs recalculation in an optimal manner by maintaining an indication of which cells have been modified, examining each occupied cell in the spreadsheet only once in determining which cells have been affected by modification (and, thus, require recalculation), creating an ordered list of cells requiring recalculation, and visiting and recalculating only those cells which require recalculation.

SUMMARY OF THE INVENTION

When one or more cells in a spreadsheet are modified, the apparatus and process using the invention determine which cells are affected and, therefore, need to be recalculated. The affected cells are then recalculated in an optimal manner. It is the object of this invention to provide the most efficient method by which affected cells are flagged and recalculated.

First, when a spreadsheet is created, a Dependency Set is constructed for each cell by storing a list of cells whose values depend on the value of the cell. The Dependency Set for each cell is then maintained with the spreadsheet. When a spreadsheet cell is modified by the spreadsheet user, the cell is flagged, the modified cell is removed from the Dependency Set of all cells which it referenced prior to being modified, and the modified cell is added to the Dependency Set of all cells which it references after it has been modified.

Secondly, the value of a cell cannot be calculated until the cells upon which it depends have been calculated. (For example, if cell A1 contains the formula "A2+A3," the value of cell A1 cannot be calculated until the values of cells A2 and A3 have been calculated. Cell A1 is said to "depend on" cells A2 and A3.) To this end, two lists are maintained to perform the recalculation, the RECURSION LIST (hereinafter "R LIST"), an intermediate list, and the LIFO LIST (hereinafter "L LIST"), a final list. The L LIST, initially empty, ultimately contains a list of all cells to be recalculated in the order in which they will be recalculated. The R LIST, on the other hand, contains a list of cells which need to be recalculated but have not yet been added to the L LIST as a result of the cells which they reference (i.e., their "dependent cells") having not yet been added to the L LIST.

Recalculation is accomplished by proceeding through the CELL INFORMATION LIST (which may, but need not be, a bit map array), starting with the first block of information in the list (which contains information related to the first cell in the spreadsheet). If the Modified Bit in the information block indicates the cell has been modified, the cell is placed in either the L LIST or the R LIST; otherwise it is skipped. (Note that although the "cell" itself is referred to as being placed in the R LIST and L LIST, it is not the actual cell, but rather an indication of the cell such as its address, which is placed in the list.) The modified cell is placed in the L LIST if it has no cells in its Dependency Set; it is placed in the R LIST if it has one or more cells in its Dependency Set.

After a cell has been placed in the R LIST, it is then likewise determined for each cell in the cell's Dependency Set whether it should be added to the L LIST or the R LIST. Thus, cells with one or more cells in their Dependency Set are added to the top of the R LIST and their Dependency Sets processed immediately thereafter starting with the first cell. After all its dependent cells have been added to the L LIST, a cell is removed from the R LIST and added to the L LIST. The same process is then repeated with the next cell in the R LIST. If the R LIST becomes empty, processing continues with the next information block in the CELL INFORMATION LIST that has not already been examined.

The process continues until the information block in the CELL INFORMATION LIST for each occupied cell in the spreadsheet has been examined and no cells remain in the R LIST. At this point, every modified cell in the spreadsheet has been placed on the L LIST in the reverse order of which it is to be recalculated. A "circular reference" in the spreadsheet, however, can prevent recalculation. A circular reference occurs when a modified cell is examined which is already in the R LIST, i.e., when a cell is dependent upon itself, either directly or indirectly. When a circular reference occurs, a message indicating such is generated for the user and the circular reference is handled accordingly. (See the Description of an Illustrative Embodiment.)

After each information block in the CELL INFORMATION LIST has been examined (and all circular references have been noted), the cells which require recalculation are ordered in the L LIST. Each cell on the L LIST is then sequentially removed from the list in reverse order and recalculated, after which the recalculation process is complete.

DESCRIPTION OF AN ILLUSTRATIVE EMBODIMENT

Accounting spreadsheet application programs, or generically, spreadsheet programs, are well known and widely used in the microcomputer industry. Spreadsheet programs are also common, however, on larger digital computer systems, including mini-computers and mainframes. To be effective, spreadsheet programs in any computer system must have the capacity to enable the user to modify a completed spreadsheet and to recalculate the modified cells.

Figure 1:
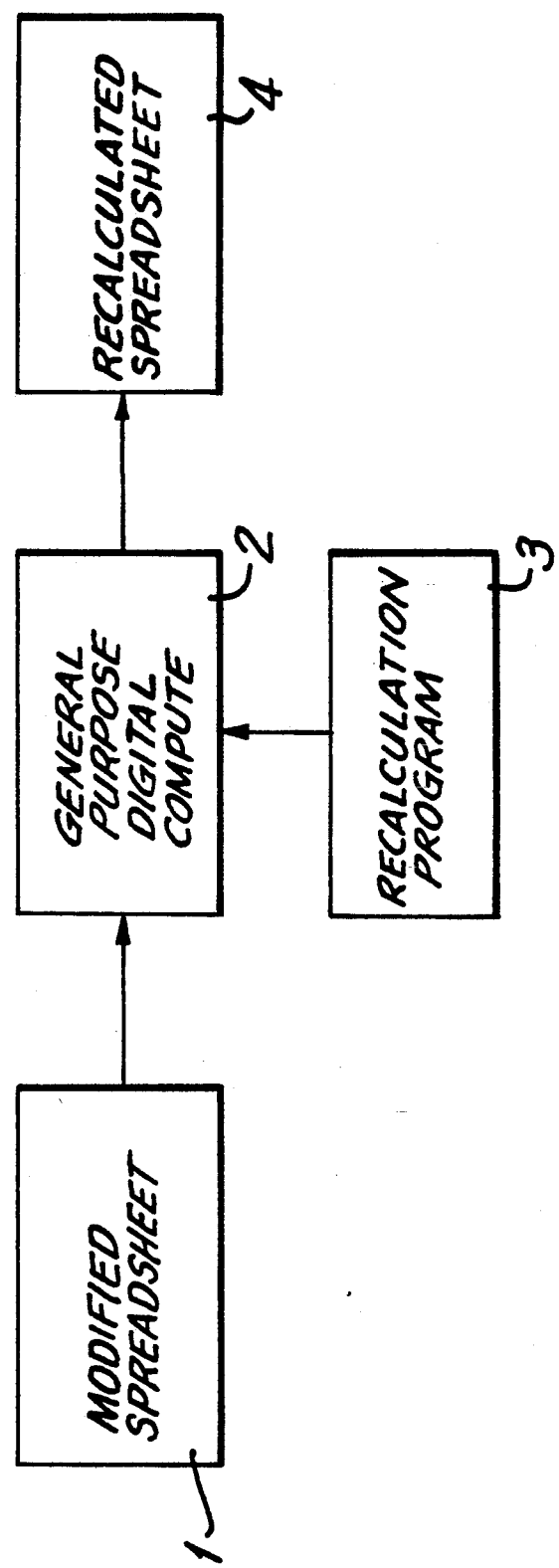
FIG. 1 is a simple block diagram showing the general sequence and organization for the recalculation of a spreadsheet using a digital computer.

Referring to FIG. 1, a modified spreadsheet 1 is processed by a general purpose computer 2 which is executing a recalculation program 3, the recalculation program 3 being part of a spreadsheet program. The result is a recalculated spreadsheet 4 in which all cells affected by the modification have been recalculated. The process of the present invention has been actually implemented in the environment of an IBM PC-compatible personal computer running the MS-DOS operating system.

TABLE 1 below is a simple spreadsheet model which calculates the combined net income of two taxpayers. The spreadsheet contains three rows (labeled 1 through 3) and five columns (labeled A through E), forming a total of fifteen cells. The cells will be referred to by their row and column number. Thus, the cell in column A and row 1 is referred to as cell "A1." It will be observed that the cells in columns A, D, and E contain formulas while the cells in columns B and C will contain user supplied data.

TABLE 1

|   |   | A<br>NET<br>INCOME<br>("NI") | B<br>GROSS<br>INCOME<br>("GI") | C<br>DEDUCTION<br>("DED") | D<br>FED<br>TAX<br>("FT") | E<br>STATE<br>TAX<br>("ST") |
|---|---|---|---|---|---|---|
| 1 | TAXPAYER 1 | GI − FT − ST | GI<br>Data | DED<br>Data | (GI − DED)<br>*0.28 | (GI − FT)<br>*0.10 |
| 2 | TAXPAYER | GI − FT − ST | GI | DED | (GI − DED) | (GI − FT) |

TABLE 1-continued

|   |   | A<br>NET<br>INCOME<br>("NI") | B<br>GROSS<br>INCOME<br>("GI") | C<br>DEDUCTION<br>("DED") | D<br>FED<br>TAX<br>("FT") | E<br>STATE<br>TAX<br>("ST") |
|---|---|---|---|---|---|---|
| 2 |   |   | Data | Data | *0.28 | *0.10 |
| 3 | TOTAL | NI TAXPAYER 1<br>+<br>NI TAXPAYER 2 |   |   |   |   |

Referring to TABLE 1, cell B1 contains taxpayer 1's gross income, cell C1 contains taxpayer 1's standard deduction, cell D1 contains a simplified formula for calculating taxpayer 1's federal tax liability (28 percent of gross income less the deduction), and cell E1 contains a simplified formula for calculating taxpayer 1's state tax liability (10 percent of gross income less the deduction). Cell A1 contains a formula which calculates taxpayer 1's net income (gross income less federal tax and state tax). The cells in row 2 for taxpayer 2 are similar to those in row 1. Finally, cell A3 contains the combined net income for taxpayers 1 and 2.

By substituting the cell numbers in the formulas in the spreadsheet in TABLE 1, TABLE 2 below shows the interdependencies of the cells in TABLE 1.

TABLE 2

|   |   | A<br>NET<br>INCOME<br>("NI") | B<br>GROSS<br>INCOME<br>("GI") | C<br>DEDUCTION<br>("DED") | D<br>FED<br>TAX<br>("FT") | E<br>STATE<br>TAX<br>("ST") |
|---|---|---|---|---|---|---|
| 1 | TAXPAYER 1 | B1 − D1 − E1 | Data | Data | (B1 − C1)<br>*0.28 | (B1 − D1)<br>*0.10 |
| 2 | TAXPAYER 2 | B2 − D2 − E2 | Data | Data | (B2 − C2)<br>*0.28 | (B2 − D2)<br>*0.10 |
| 3 | TOTAL | A1 + A2 |   |   |   |   |

The Dependency Set for each cell in the spreadsheet can now be easily determined from TABLE 2. For example, the Dependency Set for cell B1 is {A1,D1,E1} since the value of cells A1, D1, and E1 are dependent upon the value of cell B1. Thus, if cell B1 changes, the results of cells A1, D1, and E1 will also change. The Dependency Set for each cell is as follows:

TABLE 3

| A1: {A3} | B1: {A1,D1,E1} | C1: {D1} | D1: {A1,E1} | E1: {A1} |
|---|---|---|---|---|
| A2: {A3} | B2: {A2,D2,E2} | C2: {D2} | D2: {A2,E2} | E2: {A2} |
| A3: — | B3: — | C3: — | D3: — | E3: — |

The Dependency Set is constructed as the spreadsheet is created.

Figure 2:
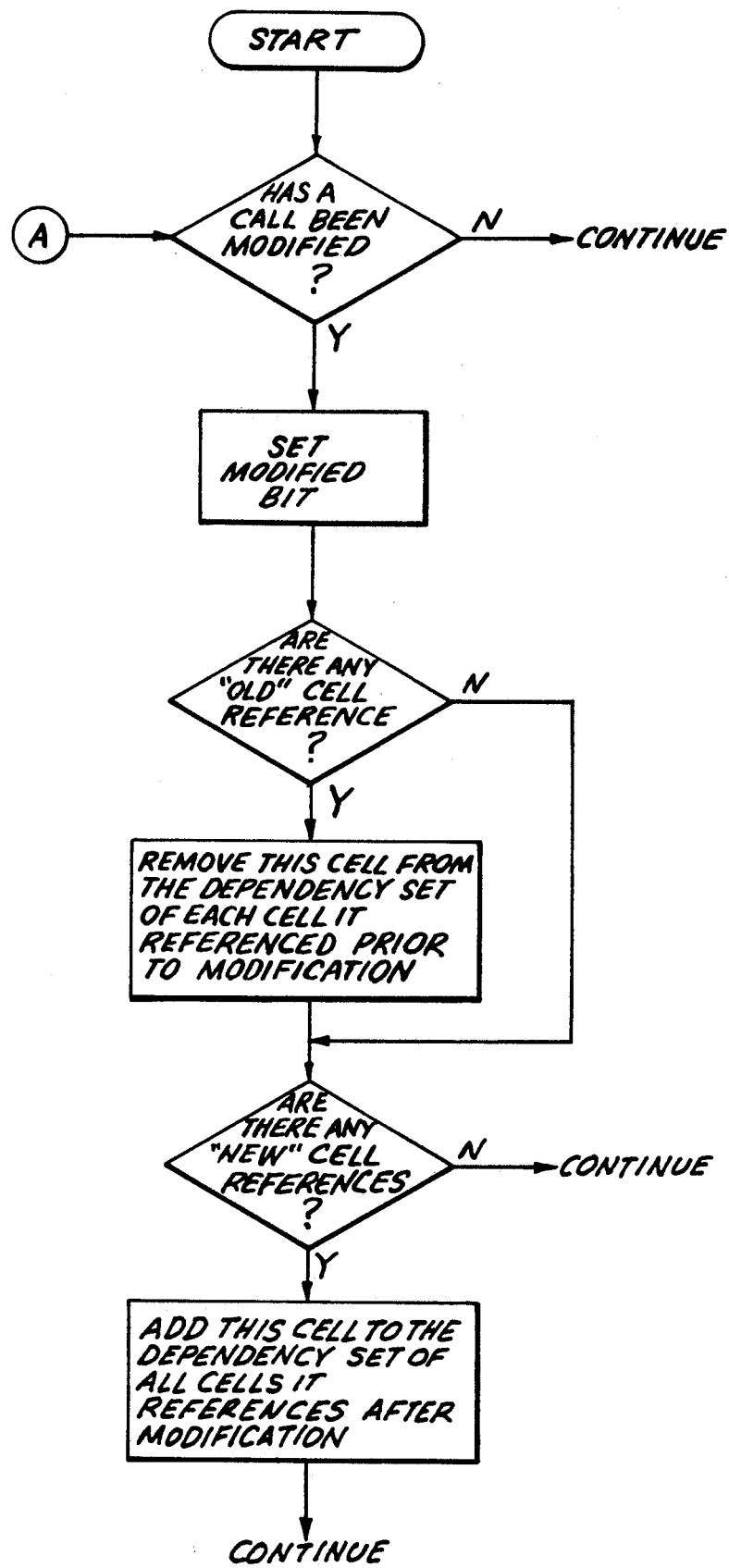
FIG. 2 is a flow chart for the cell modification algorithm according to this invention by which modified cells are prepared for recalculation.

Referring to FIG. 2, whenever a cell is modified it is marked as such in the CELL INFORMATION LIST by setting a "modified Bit." If the modified cell referenced other cells before being modified, it is then removed from the Dependency Set of the cells that it referenced. If the modified cell references an cells after it has been modified it is then added to the Dependency Set of the cells which it now references. For example, referring to TABLE 1, if cell D1 were modified so that the Deduction was no longer subtracted from Gross Income (i.e., so that the formula read "GI*0.28" instead of "(GI-DED)*0.28"), cell D1 would be removed from the Dependency Set for cell C1, the Deduction cell, since cell D1 would no longer reference cell C1.

Figure 3:
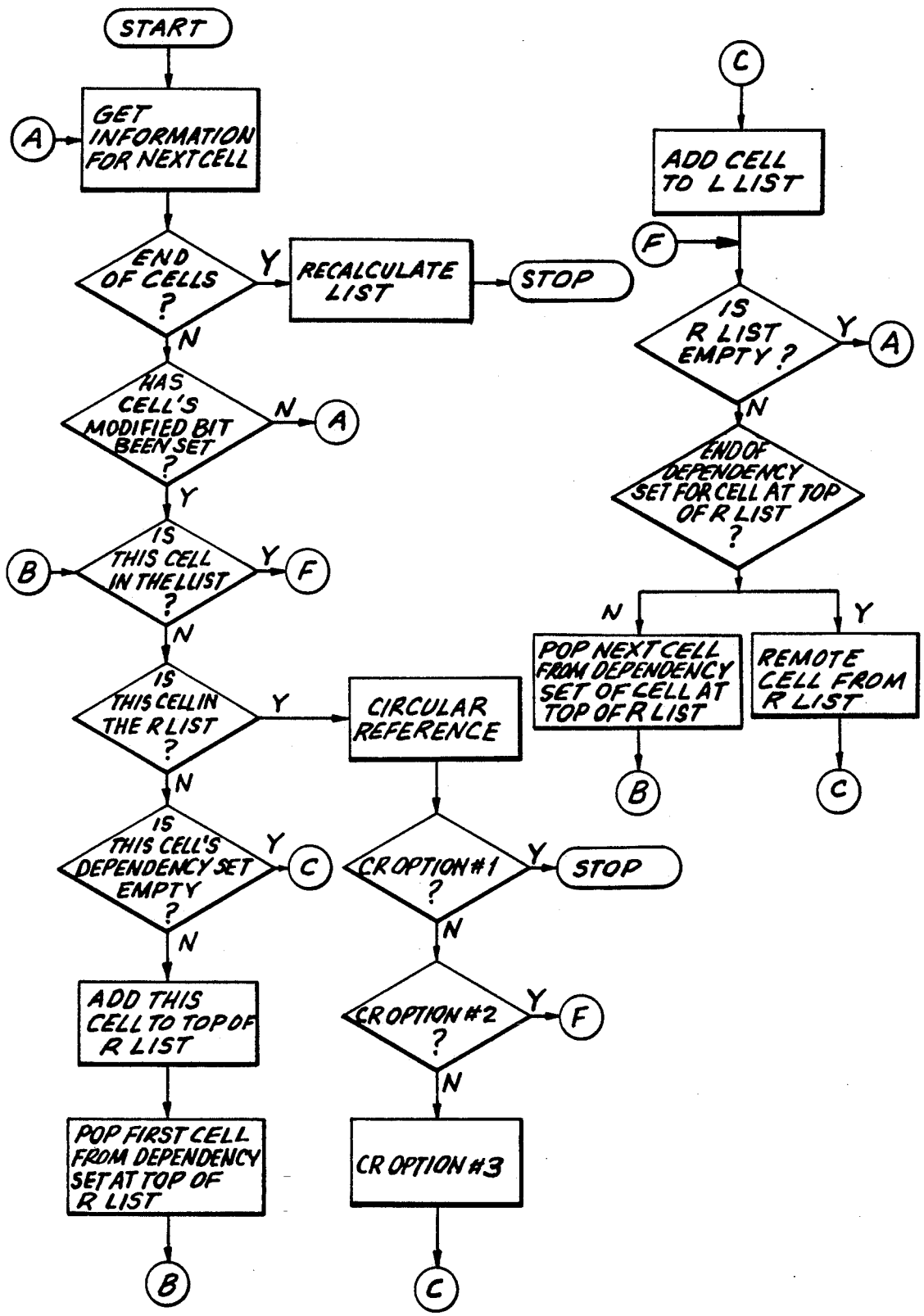
FIG. 3 is a flow chart for the algorithm of the cell recalculation program according to this invention.

Recalculation according to the invention is accomplished by "examining" each cell in the spreadsheet only once. A cell is "examined" by checking the information block in the CELL INFORMATION LIST corresponding to the cell; that is, by testing the status of the "modified bit." Referring to FIG. 3, recalculation of a modified spreadsheet begins by examining the first cell in the spreadsheet, cell A1, and continuing to examine cells until each occupied cell in the spreadsheet has been examined. Each time the recalculation program examines a new cell, it first checks whether every occupied cell in the spreadsheet has already been examined. If every occupied cell has not been examined, the program determines whether the current cell has been modified by checking the "modified bit" in the CELL INFORMATION LIST. If the cell has not been modified, the program moves on to the next cell in the spreadsheet.

If the current cell has been modified, the central loop of the recalculation program is entered. The program first determines whether the modified cell is already in the L LIST. The case in which the modified cell is already in the L LIST is discussed below. If it is not in the L LIST, then it is determined whether it is in the R LIST. If it is already in the R LIST, a "circular reference" exists as described below. If the modified cell is not in the R LIST, it is determined whether its Dependency Set is empty. If its Dependency Set is empty, then the modified cell does not need to be recalculated prior to any other cells in the spreadsheet and it is therefore added directly to the L LIST. On the other hand, if the modified cell's Dependency Set is not empty, the cells in its Dependency Set must be calculated after the value of the modified cell is itself recalculated. Thus, if the modified cell's Dependency Set is not empty, that modified cell is added to the top of the R LIST. Then the first cell in that cell's Dependency Set is examined.

At this point the central loop of the recalculation program is entered again. That is, it is determined whether the current cell being examined is already in the L LIST. If it is not in the L LIST, then the program proceeds as described above. If it is already in the L LIST, then there is nothing more to be done with the current cell and it is time to move on to the next cell. At this point, if the R LIST is not empty, the next cell to be examined is always taken from the R LIST rather than continuing on to the next as yet unexamined cell in the spreadsheet. Accordingly, it is determined whether the R LIST is empty. Only if the R LIST is empty does the program examine the next unexamined cell, otherwise the program examines the next cell in the Dependency Set of the cell currently at the top of the R LIST. If, however, the last cell in the Dependency Set of the cell currently at the top of the R LIST has been examined then the cell at the top of the R LIST is removed from the R LIST and added to the L LIST. At this point, the next cell to be examined is determined as described above: it is the next as yet unexamined cell in the Dependency Set of the cell at the top of the R LIST or, if the R LIST is empty, it is the next unexamined cell in the spreadsheet.

Finally, if it is determined that the cell being examined is already in the R LIST, a "circular reference" condition exists. In essence, this means that a cell is dependent upon itself, i.e., it presents the condition of requiring its own result before it can be calculated. When this occurs, the recalculation program informs the spreadsheet user of the condition and either (1) the recalculation process is terminated, (2) the "circular cell" is recalculated at its relative position in the circular reference cell chain (i.e., processing continues as though there were no circular reference which results in the circular cell being placed in the L LIST when the reference to it in the R LIST is popped from the R LIST), or (3) the "circular cell" is recalculated at the end of the circular chain and in its relative position in the chain (i.e, the circular cell is placed in L LIST twice—at the time the circular reference is encountered and again when it is popped from the R LIST).

Actual recalculation of cells affected by the modification begins after the R LIST is empty and every cell in the spreadsheet has been examined exactly once. At this point the L LIST contains the list of affected cells in the optimal order for recalculation. Thus, beginning with the last cell placed in the list and proceeding in reverse order, the recalculation program sequences through the L LIST and recalculates each cell in the list, after which recalculation is complete.

Due to the large number of steps in the method, the following example is limited to the modification of a single cell. Referring to TABLE 1, suppose, as we did above, that cell D1 is modified so that the Deduction in cell C1 is no longer subtracted from Gross Income (i.e., so that the formula reads "GI*0.28" instead of "(GI-DED)*0.28"). In recalculating the spreadsheet, the recalculation program begins with cell A1. Finding it unchanged, it examines cells B1 and C1 before discovering that cell D1 has been modified. The L LIST is then checked and found not to contain cell D1, as is the R LIST. Then, after determining that cell D1's Dependency Set is not empty (see TABLE 3, it contains cells A1 and E1), cell D1 is placed at the top of the R LIST. The first cell in cell D1's Dependency Set, cell A1, is then examined. The recalculation program then determines that cell A1 is in neither the L LIST nor the R LIST. Thus, it next checks cell A1's Dependency Set and, finding that it is not empty (it contains cell A3), pushes cell A1 onto the top of the R LIST. The R LIST now contains cell A1 on top of cell D1.

Next, the first (and only) member of cell A1's Dependency Set, cell A3, is checked. Finding that cell A3's Dependency Set is empty, the recalculation program places cell A3 in the L LIST as its first member. Then, since the R LIST is non-empty the Dependency Set of the cell at the top of the R LIST (cell A1) is checked. After it is determined that the end of cell A1's Dependency Set has been reached, cell A1 is removed from the R LIST and added to the L LIST. The R LIST now contains only D1 while the L LIST now contains A3 and A1.

The recalculation program then determines that the R LIST contains cell D1. The next cell in the Dependency Set of cell D1, cell E1, is then examined. After it is determined that cell E1 is in neither the L LIST nor the R LIST, cell E1 is pushed onto the top of the R LIST. The first member of cell E1's Dependency Set, cell A1 is then checked and found to already be on the L LIST. Thus, the program returns to the top of the R LIST and finds that the end of cell E1's Dependency Set has been reached. Cell E1 is then removed from the R LIST and added to the L LIST as its third member. The R LIST now contains only cell D1 while the L LIST contains cells, A3, A1, and E1.

Next, it is determined that the end of the Dependency set of cell D1, the cell at the top of the R LIST, has been reached. Thus cell D1 is removed from the R LIST and added to the L LIST. The R LIST is now empty while the D LIST contains cells A3, A1, E1, and D1. Since the R LIST is empty, the program continues to examine each previously unexamined cell—cells A2 through E2 (cells B3 through E3 are unused)—until every cell has been examined. Finally, the recalculation program recalculates each cell in the L LIST in the opposite order of which they were placed in the list: D1, E1, A1, and A3. At this point, recalculation is complete.

It should be observed that, in the example, a small modification to a very small spreadsheet affected the value of four cells. From this, it is apparent that multiple modifications to a large spreadsheet can result in extensive recalculation requirements. A spreadsheet is clearly a much more powerful and efficient tool when recalculation is achieved in the quickest possible manner. The method disclosed above is the optimal method for achieving recalculation.

The invention is not limited to two-dimensional spreadsheets as disclosed above. Complex spreadsheets may be represented in arrays of three or more dimensions. A three-dimensional spreadsheet, for example, would define each cell with three coordinates, an X coordinate, a Y coordinate, and a Z coordinate. The method of recalculation applies equally to spreadsheets with greater than two dimensions.

We claim:

1. A method of operating a digital computer with memory and storage to efficiently recalculate a spreadsheet after the information stored in one or more cells of the spreadsheet has been modified, the method comprising the steps of:

(a) creating in turn for each cell of the spreadsheet a dependency set comprising the locations of all other cells whose values are dependent on the value of that cell;

(b) storing the dependency sets in memory;

(c) creating in memory two locations for storage of ordered lists, a first location for an ordered R LIST of cells which need to be recalculated and which have at least one cell in their dependency sets, and a second location for an ordered L LIST of cells with all cells in their dependency set already in the L LIST when they are placed in the L LIST;

(d) after the values stored in one or more cells of the spreadsheet have been modified, examining a cell to determine whether the value stored in the cell has been modified;

(e) if the value stored in the examined cell has been modified, either (1) placing the examined cell at the top of the L LIST if all cells in its dependency set are already in the L LIST or if there are no cells in its dependency set, or (2) otherwise placing that cell at the top of the R LIST;

(f) if there is a cell in the R LIST, either (1) repeating steps (d) and (e) for the next cell in the dependency set of the cell at the top of the R LIST that has not been examined, or (2) moving the cell from the top of the R LIST to the top of the L LIST when all cells in said cell's dependency set have been added to the L LIST;

(g) repeating steps (d) and (e) for the next cell in the spreadsheet that has not been examined;

(h) repeating steps (d) through (g) until all cells been examined and either the L LIST storage area contains a reordered list of all cells affected by the modification or one or more cells remain in the R LIST; and then either (i) (1) if no cells remain in the R LIST, recalculating the values of the cells in the L LIST in reverse order of which they were stored in the list; or (2) if one or more cells remain in the R LIST, generating an indication that the spreadsheet contains a circular reference.

2. The method of claim 1 further including the step of maintaining information about each cell, including a bit indicating whether the value of that cell has been modified since the last recalculation of the spreadsheet, in a CELL INFORMATION LIST, and the sequentially examining step includes examining the status of the modification bit in the CELL INFORMATION LIST.

3. The method of claim 1 further including the step of handling a circular reference, wherein if an examined cell has been changed and is already in the R LIST, placing the examined cell in neither the R LIST nor the L LIST and repeating the examining step for the next cell, whereby the examined cell will be recalculated once in its relative position in the circular chain of cells.

4. The method of claim 1 further including the step of handling a circular reference, wherein if an examined cell has been changed and is already in the R LIST, placing the examined cell in the L LIST and repeating the examining step for the next cell, whereby the examined cell will be recalculated at both the end of the circular chain of cells and in its relative position in the circular chain of cells.

* * * * *